United States Patent [19]

Vizcaino

[11] Patent Number: 5,317,636
[45] Date of Patent: May 31, 1994

[54] METHOD AND APPARATUS FOR SECURING CREDIT CARD TRANSACTIONS

[75] Inventor: Gerardo Vizcaino, Nashua, N.H.

[73] Assignee: Arris, Inc., Nashua, N.H.

[21] Appl. No.: 988,418

[22] Filed: Dec. 9, 1992

[51] Int. Cl.⁵ .............................................. H04K 1/00
[52] U.S. Cl. ...................................... 380/23; 380/24; 380/21; 380/49
[58] Field of Search ...................... 380/23, 24, 25, 21, 380/49

[56] References Cited

U.S. PATENT DOCUMENTS

| | | |
|---|---|---|
| 4,281,215 | 7/1981 | Ataila . |
| 4,386,266 | 5/1983 | Chesarek . |
| 4,442,345 | 4/1984 | Mollier et al. . |
| 4,501,957 | 2/1985 | Perlman et al. . |
| 4,599,489 | 2/1984 | Cargile . |
| 4,626,669 | 12/1986 | Davis et al. . |
| 4,629,872 | 12/1986 | Hallberg . |
| 4,656,342 | 4/1987 | Ugon . |
| 4,679,236 | 7/1987 | Davies . |
| 4,720,860 | 11/1984 | Weiss . |
| 4,742,351 | 5/1988 | Suzuki . |
| 4,766,293 | 8/1988 | Boston . |
| 4,786,790 | 11/1988 | Kruse et al. . |
| 4,811,393 | 3/1989 | Hazard . |
| 4,816,651 | 3/1989 | Ishording . |
| 4,816,655 | 3/1989 | Musyck et al. . |
| 4,849,613 | 7/1989 | Eisele . |
| 4,868,372 | 9/1989 | Oomura et al. . |
| 4,879,747 | 11/1989 | Leighton et al. . |
| 4,885,778 | 12/1989 | Weiss . |
| 4,974,193 | 11/1990 | Beutelspacher et al. . |
| 5,017,766 | 5/1991 | Tamada et al. .............. 380/24 |
| 5,023,908 | 6/1991 | Weiss . |
| 5,068,894 | 9/1991 | Hoppe . |
| 5,097,115 | 3/1992 | Ogasawara et al. . |
| 5,120,939 | 6/1992 | Claus et al. . |
| 5,163,098 | 11/1992 | Dahbura .............................. 380/24 |

OTHER PUBLICATIONS

"Achieving Electronic Privacy", Anerican Scientific, Aug. 1992, pp. 96–101.

Flanagan, W. G. and McMenamin, B., "For Whom the Bells Toll", Forbes Magazine, Aug. 3, 1992, 5 pages (believed to be pages 60–64).

Primary Examiner—David C. Cain

[57] ABSTRACT

This disclosure relates to a method and apparatus for improving the security of credit card transactions. It involves a so-called "smart" credit card, which includes a processor, a memory, and a display window. When used, the card produces a verification number, which is based on a transaction sequence number and an encryption algorithm stored in the memory of the card. The verification number produced by the card is read in the display window and transmitted to a verification computer. The computer uses the verification number, together with a de-encryption algorithm, to produce a computed transaction sequence number. If the computed transaction sequence number corresponds to a transaction sequence number stored in the memory of the computer, then the computer will authorize the transaction, otherwise it will not. Both the card and computer change their respective transaction sequence numbers, such as by incrementation, so that different transaction sequence numbers are stored in the respective memories, for the production of a different verification number for the next transaction.

33 Claims, 8 Drawing Sheets

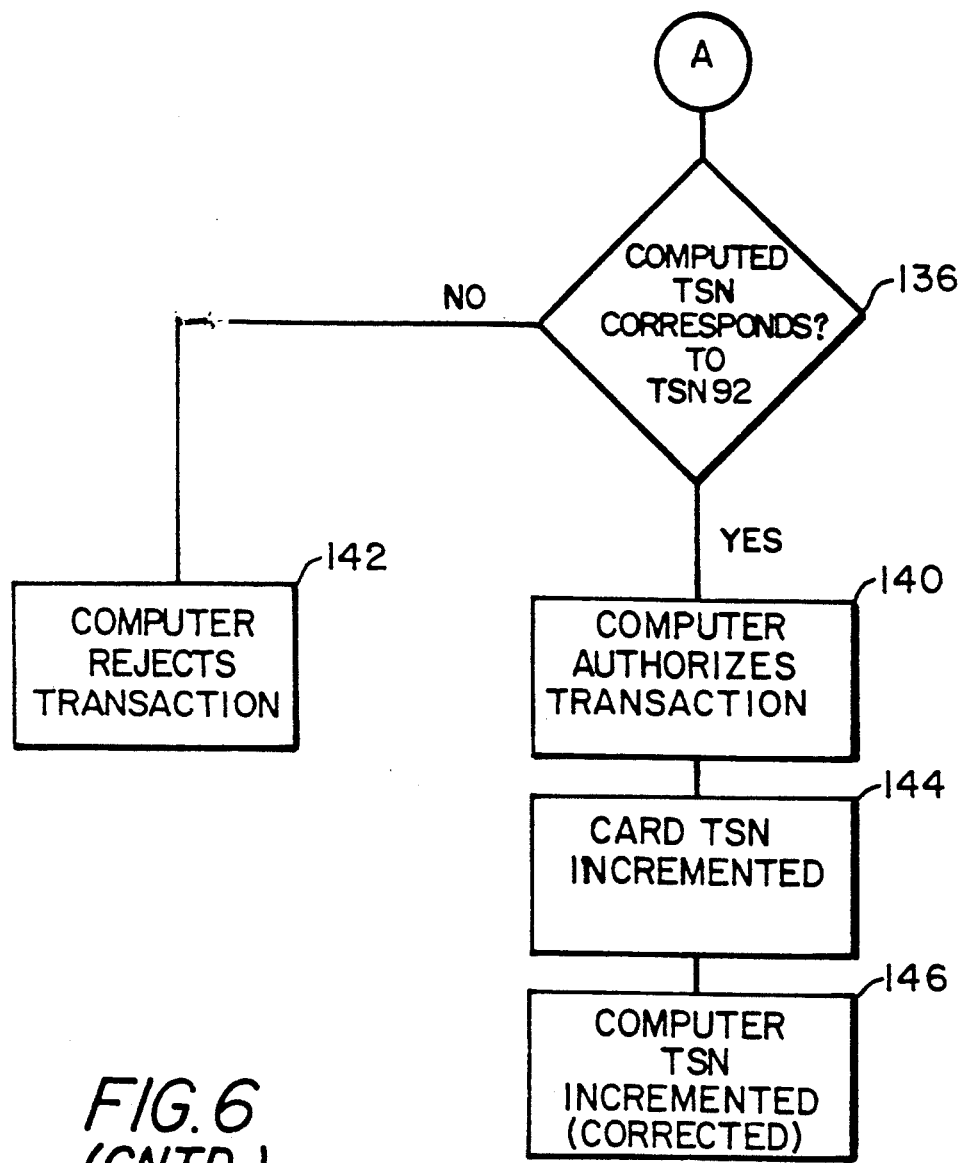
FIG. 6 (CNTD.)

METHOD AND APPARATUS FOR SECURING CREDIT CARD TRANSACTIONS

FIELD OF THE INVENTION

This invention relates to a method and apparatus for securing a transaction conducted by means of a credit card.

BACKGROUND OF THE INVENTION

The use of credit cards for many types of transactions is already commonplace, and is steadily increasing as society moves progressively to a cashless monetary system. The proliferation of the use of credit cards, however, has been met with a corresponding proliferation in the methods by which unscrupulous persons may use credit card information to engage in fraud or theft.

For example, one typical credit card transaction involves a person who uses a telephone credit card to make a telephone call at a public telephone. The transaction sequence usually requires the user to first dial an access number to make contact with a long distance carrier. The access number is generally, publicly available, since it is distributed to all subscribers to the carrier's service and is sometimes even displayed in the public telephone area. After receiving a confirmation signal, the caller then enters a customer specific, account number, which is made up of a series of numerals often printed on the credit card for ease of user access. Unlike the access number which is public, the account number should be kept secret by the card owner, given that it is used by the carrier to determine if a valid account number has been presented when the service request is initiated. Of even greater importance to the card holder, the account number usually identifies the account to which the requested telephone service will be billed.

Understanding that someone who has the telephone account number can use that number to place unauthorized calls, a practice has grown up by which thieves have devised different methods by which they gain access to the account numbers of legitimate card holders. One such practice is referred to as "shoulder surfing", whereby the thief watches, sometimes by means of binoculars, and memorizes the customer unique, account number entered by a legitimate card holder. Modern, public telephone areas in airports, train stations, shopping malls, and the like, make the true card owners particularly vulnerable to this practice given that the design of many public telephone areas typically permit members of the public to freely move around and behind the caller. Thus, someone in a publicly accessible area could have a clear view of the account number on the card or entered on the telephone key pad during the transaction, especially if the caller inadvertently neglects to guard the secrecy of the account number.

Yet another example of the means by which a thief may gain access to a legitimate card holder's account number may involve a typical credit card purchase from a retailer. During such a transaction, the card holder's account number is exposed to the retailer's clerk processing the transaction. Additionally, if the transaction is conducted with the card holder present in person, there is typically paperwork, such as a hard copy receipt, which is generated during the transaction and which contains the account number. Frequently, carbon paper inserts, which are between the receipt paperwork, are discarded in an unsecured manner after the card holder provides an authorization signature, even though those carbon paper inserts may contain the account number of the customer.

Thus, an unscrupulous clerk could later attempt to use the account number to engage in fraudulent transactions. Alternatively, another party who gains access to the discarded carbon paper could likewise attempt to use the account number to engage in a fraudulent transaction. And finally, a so called 'shoulder surfer' could observe the transaction and obtain the account number.

What is needed is a method and apparatus by which credit card transactions can be made more secure against fraud and theft. To the extent that credit cards are mass produced, the security approach must be adapted for implementation on a wide scale, which also suggests that it must not be prohibitively expensive. The approach must take account of existing transaction equipment which is available now and in the near future. For example, most public telephone systems have touch tone key pads, but relatively few have the newer technology, card readers which read an electronic strip on the credit card. Likewise, home telephone systems, which can be used for conducting credit card transactions, are highly unlikely to include a card reader system. Finally, the security approach must be reasonably simple to use by the card holder, as significant increases in the complexity of use will reduce the desirability of the security system.

SUMMARY OF THE INVENTION

This invention relates to the apparatus and method of authorizing credit card transactions. One embodiment of the invention includes a system which is made up of an authorization computer and a credit card that work in conjunction to enhance the security of credit card transactions.

More particularly, the system includes a smart credit card which includes a processor, a memory and a liquid crystal display. The credit card is used to produce a unique verification number by processing a transaction sequence number with an encryption algorithm. The verification number is then displayed in the display device, and can be transmitted to the authorization computer along with a customer identifying account number.

The computer, which is used for authorizing the credit card transactions of the customers of the credit card issuer, uses the account number to access an account file for the credit card customer. That account file has general account data for the given customer, as well as a transaction sequence number, which corresponds to the transaction sequence number stored in the credit card. Additionally, the account file includes a de-encryption algorithm, which is complementary to the encryption algorithm of the credit card, such that the computer can use the de-encryption algorithm together with the verification number to produce a computed transaction sequence number.

The computed transaction sequence number is compared to the transaction sequence number stored in the computer to determine whether the two numbers correspond to one another. If they do, then the computer will authorize the transaction, if they do not then the transaction will be rejected.

Both transaction sequence numbers, the one in the card and the one in the computer are changed, preferably by incrementation, after the authorized transaction so that a different verification number is generated and used in the authorization of each different credit card transaction. Thus, the verification number used in one given transaction will not be useful in a subsequent transaction. Therefore, even if someone were to see the verification number used in one transaction, they would not be able to use it in a subsequent transaction.

Yet other embodiments of the invention include the credit card that is used in the system, the computer that is used in the system, and the process of authorizing credit card transactions using the system.

Objects, features, and advantages of the invention will be further appreciated and better understood upon consideration of the following detailed description of the preferred embodiment, presented in conjunction with the accompanying drawings.

DETAILED DESCRIPTION OF THE PREFERRED EMBODIMENTS

Figure 1:
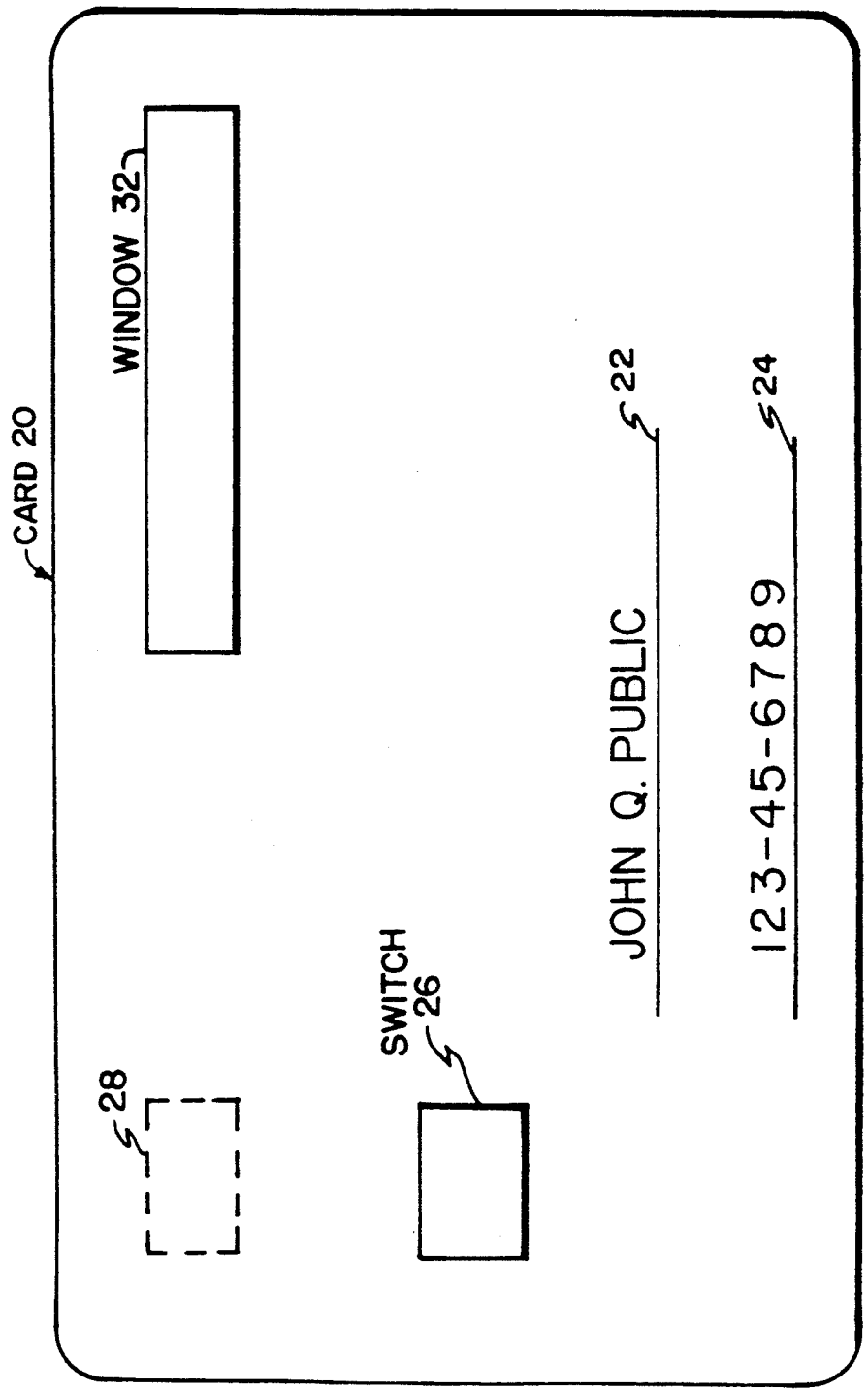
FIG. 1 is a front view of an embodiment of a "smart (credit) card" in accordance with the present invention.

Referring first to FIG. 1, an embodiment of a credit card 20 in accordance with the present invention is shown. More particularly, credit card 20 is a so-called "smart card". In some respects, card 20 is quite similar to a common credit card, insofar as it has a plastic housing with the same dimensions as a traditional credit card. Additionally, it has a magnetic strip on its back (not shown) to enable card 20 to be read by a typical card reader.

As will be detailed below, a "smart card" is more sophisticated than a traditional credit card, insofar as it contains processing capabilities. Thus, card 20 can be used as a credit card for all of the transactions requiring a traditional credit card, but it has additional capabilities which enable it to be used to increase the security of credit card transactions.

In the front view of card 20 of FIG. 1, card 20 includes the card holder's name 22 and the card holder's account number 24. Name 22 and account number 24 may be punched or stamped onto card 20 in raised numbering which is typically found on traditional credit cards. The inclusion of electronic circuitry within card 20 may affect the manner in which name 22 and account number 24 are placed on card 20, it being necessary to assure that the traditional punching or stamping method does not damage the electronic circuitry of card 20. Thus, name 22 and account number 24 may be placed on the card in any manner that is adapted for a smart card having internal electronic componentry. Also, as mentioned above, account number 24 may be stored on a magnetic strip on the back of card 20, so that account number 24 can be read by a card reader in the usual manner of a regular credit card.

As discussed below, account number 24 is card holder unique and is used by the issuer of the card to identify a particular card holder's account. The identity of the card holder's account is necessary for billing the card holder for goods or services charged against that account number.

In addition to account number 24, FIG. 1 shows card 20 to further include activation switch 26. Switch 26 is an electronic switch which activates card 20 for the purpose of having card 20 process a transaction sequence number and produce a verification number, not shown on FIG. 1, but shown on FIG. 2A. In one embodiment, switch 26 may be an on/off switch which starts the processing by card 20. In yet other embodiments, there may be a separate on/off switch, which is shown on FIG. 1 in a dashed line and has reference number 28. The advantage of having a one switch 28 for turning card 20 on, and a separate switch 26 for signalling to the processor to produce a verification number, is to provide a safeguard against the inadvertent processing of a verification number.

Also shown in FIG. 1, card 20 includes display window 32, which is for displaying the verification number. In one embodiment, window 32 is a liquid crystal display (LCD).

Figure 2A:
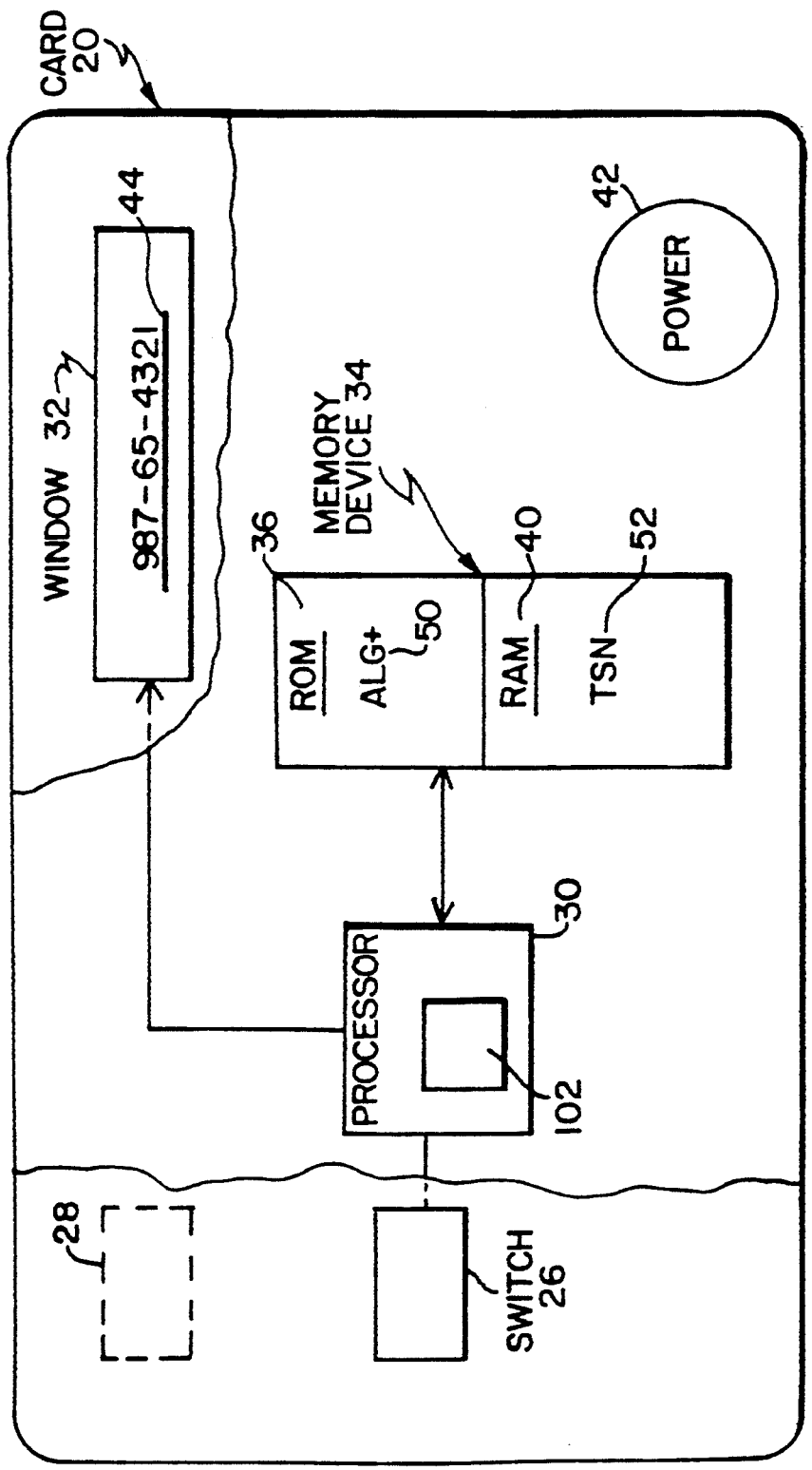
FIG. 2A is a partly sectioned, front view of the smart card of FIG. 1, showing internal elements of the card in block diagram form and a switch which activates the processing operations of the card.

Referring now to FIG. 2A, a partly sectioned, front view of card 20 is provided with the internal electronic components of card 20 shown in block diagram form. Like FIG. 1, FIG. 2A shows switches 26, 28, and window 32. In addition, FIG. 2A shows processor 30 coupled to a memory device 34. As will be detailed below, some portion of the contents of memory device 34 must be capable of being modified from time to time by processor 30. Thus, in one implementation memory device 34 could be an electronic, dynamic, random access memory (RAM) which can be read by processor 30, and can also be written to by processor 30.

Although memory device 34 contains some information that changes from time to time, it also contains some information that is never changed by processor 30. That information must nonetheless be read by processor 30 during processing operations. The information that is never changed by processor 30 may be stored in a read only device, such as a read only memory (ROM). Of course the information that is stored in ROM could be stored in RAM; however, RAM is typically made as small as possible to reduce costs. Accordingly, in the particular embodiment shown in FIG. 2A, memory device 34 includes both ROM 36 and RAM 40.

Processor 30 is coupled to window 32 so that the results of the data processed by processor 30 can be seen in window 32. Card 20 also contains power source 42 for providing the electrical energy necessary to operate the electrical components such as processor 30, memory device 34, and window 32. Given that card 20 includes RAM 40 which requires a constant charge, power source 42 will provide the charge necessary to preserve the contents of RAM 42, when card 20 is not in use and switch 28 is in the off position. Power source 42 may be one or more miniature batteries insuring that the contents of memory 34 are always powered, even when one of the batteries dies, or is removed for replacement.

In accordance with one embodiment of the invention, card 20 is used to provide a unique, transaction verification number 44, which is visually displayed in window 32, each time the card holder conducts a transaction which is to be charged on card 20. The method by which verification number 44 is used to secure the credit card transactions of the legitimate card holder will be detailed in connection with FIG. 6. Before discussing that method, however, the means by which unique, verification number 44 is generated by card 20 for each transaction is first described.

In FIG. 2A, memory device 34 is shown to include an encryption algorithm, which is abbreviated "ALG+50" and which is used by processor 30 for producing an encoded number. In accordance with the preferred embodiment of the present invention card 20 uses as ALG+50 the Data Encryption Standard algorithm described in the publication "Federal Information Processing Standards Publication" (FIBS PUB 46 of Jan. 15, 1977, of the National Bureau of Standards of the U.S. Department of Commerce and reaffirmed Jan. 22, 1988 as FIBS PUB 46-1). The method by which this preferred algorithm uses variables to produce encrypted values will be detailed below. Also, it will be clear to those skilled in the art that although a preferred algorithm has been identified, other algorithms may be used within the spirit and scope of the invention.

ALG+50 is stored in memory device 34 and does not change during or after processing operations. Thus, ALG+50 would be suitable for storage in ROM 36, although it could also be stored in RAM 40, as indicated above.

In addition to ALG+50, card 20 also has a transaction sequence number, abbreviated "TSN 52" and stored in memory device 34. In accordance with the present invention, although ALG+50 may be any one of a variety of algorithms, ALG+50 will accommodate the use of TSN 52, which will change in the manner discussed below, so that the verification number 44 generated by processor 30 is unique each time a new one is produced. Given that TSN 52 is changed by processor 30, the changed TSN 52 is written back to RAM 40 of memory device 34 by processor 30.

Figure 2B:
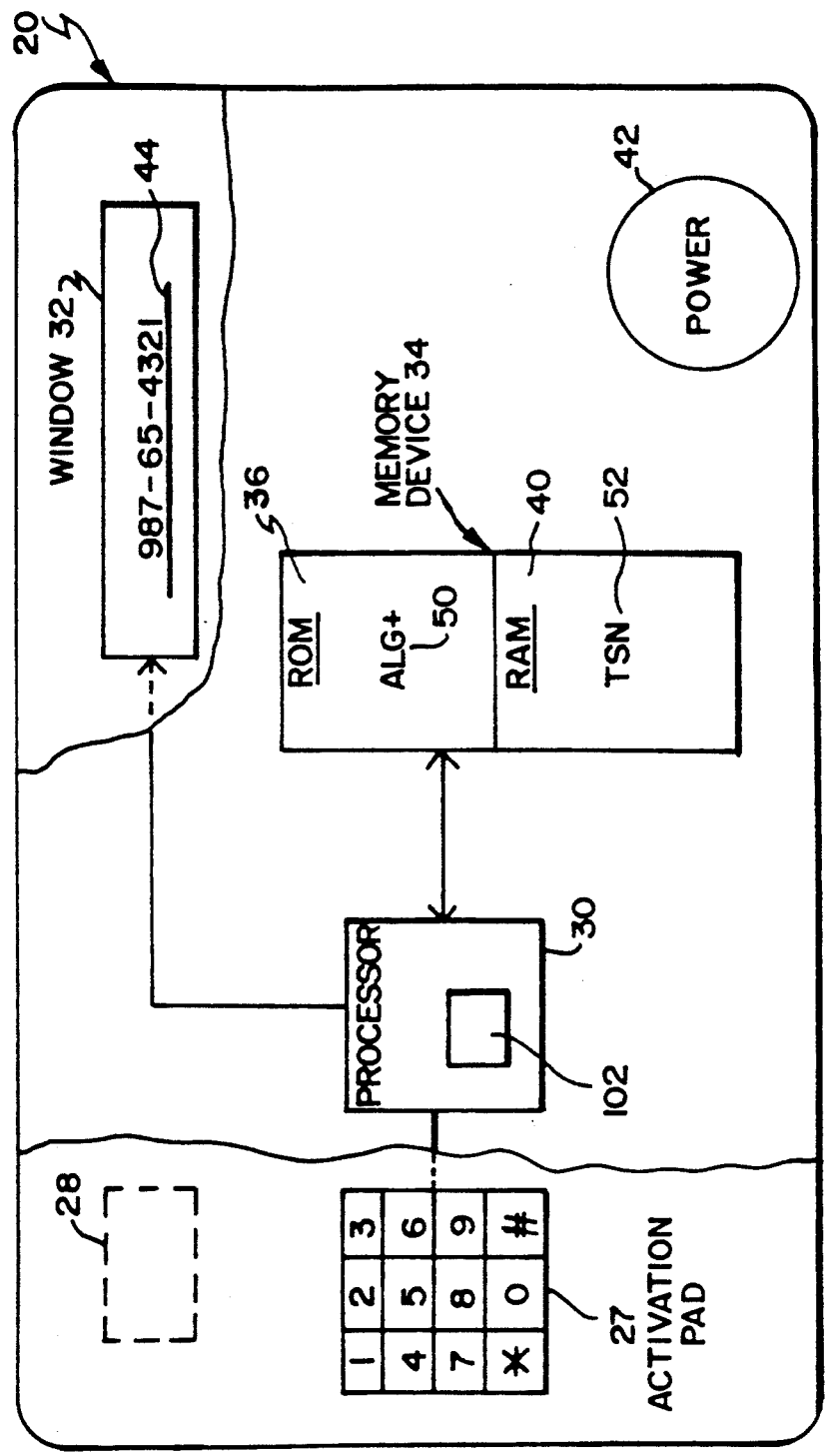
FIG. 2B provides an alternate embodiment of the card of FIG. 2A, having the switch replaced by a keypad for entering an authorization number to activate the processing operations of the card.

Referring now to FIG. 2B, an illustration of card 20 is provided in the same general format as that shown in FIG. 2A. In FIG. 2B, however, switch 26 of FIG. 2A has been replaced by activation pad 27. Activation pad 27 provides an alternate embodiment of the present invention by adding another level of security to the processing of credit transactions using card 20. In particular, activation pad 27 is a keypad on which the card owner enters an owner ID number known only to the card owner and perhaps the card issuer. In this embodiment, it is only after the proper ID number is entered that the processor will be activated to produce verification number 44. Thus, as will be detailed below, to the extent that the verification process of the present invention requires the production of a verification number 44, even if the legitimate owner's card 20 is lost or stolen, a would-be thief would not be able to use card 20, unless that person were able to determine the ID number.

Figure 3:
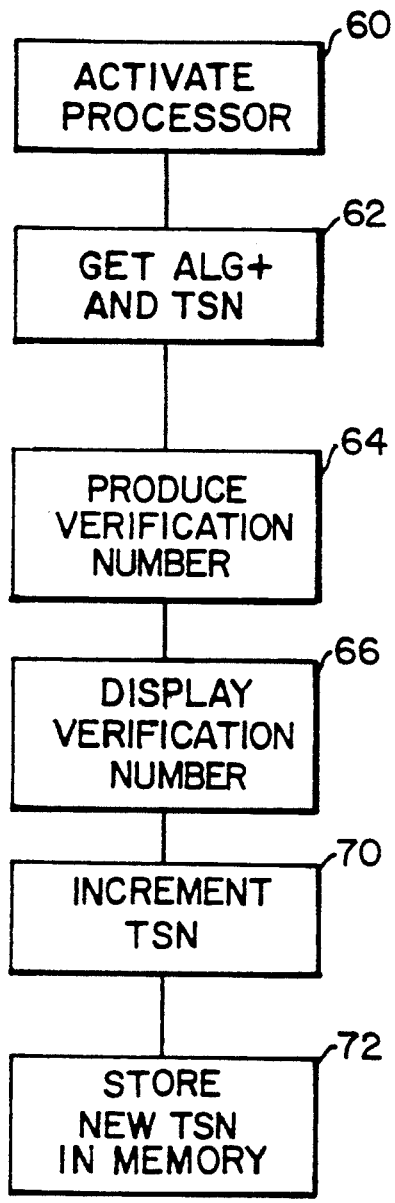
FIG. 3 is a flow diagram showing the process by which the card of FIG. 1 produces a verification number.

Having generally described the major block components of card 20, reference is now made to FIG. 3 in which a flow diagram is presented for describing the process by which card 20 produces verification number 44. As shown in FIG. 3, the process begins with activating processor 30 by switch 26, in FIG. 2A, or pad 27, in FIG. 2B (Step 60, FIG. 3). In response, processor 30 retrieves ALG+50 and TSN 52 from memory device 34 (Step 62, FIG. 3). Next, processor 30 uses TSN 52 together with ALG+50 for the purpose of producing verification number 44. More particularly, the solution of the mathematical equations which comprise ALG+50 require the use of TSN 52 as a variable. Thus, processor 30 processes ALG+50 together with TSN 52 to produce verification number 44 (Step 64, FIG. 3). After verification number 44 is produced by processor 30, verification number 44 is displayed in window 32, shown on FIGS. 2A, 2B (Step 66, FIG. 3).

Still referring to FIG. 3, after verification number 44 is displayed, processor 30 takes the specific value of TSN 52 that was used to produce verification number 44 for the particular transaction and changes that value to a different value. In the preferred embodiment, processor 30 changes TSN 52 by incrementing it by a given number; however, it will be clear to those skilled in the art that other methods of changing TSN 52 will be suitable, such as decrementing it, or applying a multiple factor. When processor 30 adds the incrementation factor, such as the number one (Step 70, FIG. 3), the incremented value becomes a new TSN 52, which is stored back in memory device 34 for use in connection with the next transaction (Step 72, FIG. 3).

After the card owner has completed the use of card 20 in connection with the particular transaction, card 20 can be turned off, if it has a separate on/off switch, such as switch 28 discussed in connection with FIG. 1.

The preferred embodiment of the invention uses the Data Encryption Standard algorithm identified above. By way of example, Table A includes an illustration of how this particular algorithm can be used to encrypt a series of numbers. In this particular implementation, the algorithm requires an "Input", which is the value of TSN 52, and it produces an "Output" which is verification number 44. Additionally, the algorithm includes another input, called the "Encrypt Key"; however, that particular input was set to an arbitrarily chosen constant, so that the algorithm effectively only requires one "Input", which is TSN 52. In particular, the arbitrary constant for the "Encrypt Key" value was equal to 16035950.

TABLE A

| INPUT (TSN 52) | ENCRYPTED OUTPUT (VERIFICATION NUMBER 44) |
| --- | --- |
| 1.0000 | 7ED3323FA1601E21 |
| 2.0000 | F36161065EB2ADFD |
| 3.0000 | 6C0BE1CA263A3D1E |
| 4.0000 | 809D777FF00CA02B |
| 5.0000 | C1D2497E7CBC2AF3 |

As seen from Table A, even though the TSN 52 values are incremented by 1, such that each successive TSN 52 has a clear relationship to its predecessor, the verification numbers 44 produced by the algorithm using the TSN's 52 show no apparent relationship to one another. The undecernable relationship between successive verification numbers 44 has an impact on achieving security insofar as it is desirable to implement an encoding system through which no one is able to predict a subsequent verification number 44 after having seen a previous verification number 44. Also with respect to Table A, it should be noted that this particular implentation is based on a rather large verification number 44, which is shown in hexadecimal representation. In actual practical implementations and other embodiments of the invention, verification number 44 could be made more conveniently smaller, and could be in only base ten numbers.

Figure 4:
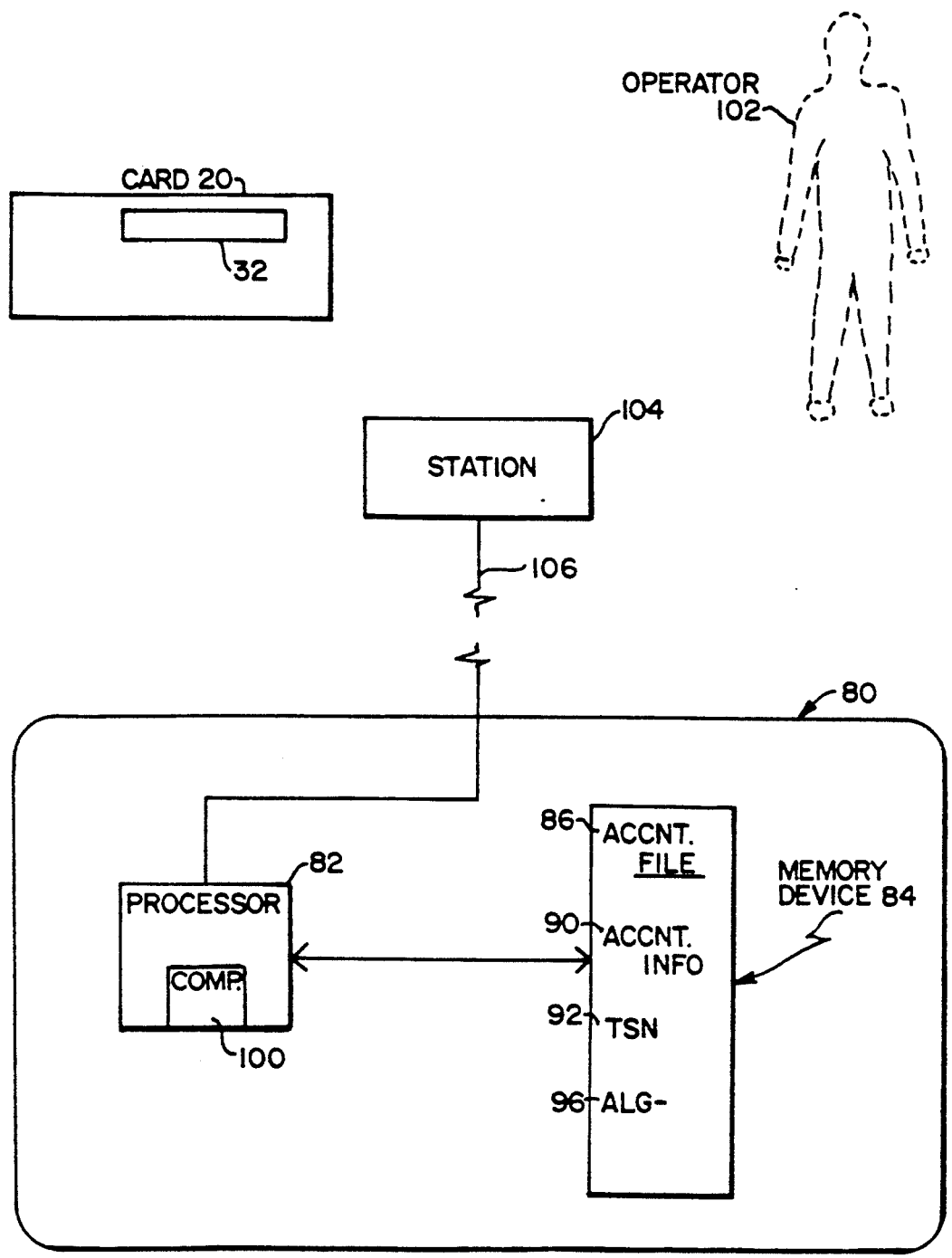
FIG. 4 is a block diagram of the card of FIGS. 1 and 2, a station which is linked to a computer, and also an operator for entering information at the station.

In accordance with the present invention, in order to implement a system by which credit card transactions are made more secure, card 20 works in concert with a verification computer 80, which is shown in block diagram form on FIG. 4. Computer 80 is a general purpose computing device, which may be linked with a network of computers. In one embodiment, computer 80 can be the type of general purpose computer which is commonly used to process and verify credit card and bank card transactions.

In order to do so, computer 80 is shown to include processor 82 and memory device 84. The storage capacity of memory device 84 of computer 80 can be far greater than that of memory device 34 of card 20, given that memory device 84 may include an electronic RAM, as well as axillary memory components, such as magnetic disk drives or tape drives.

As shown on FIG. 4, memory device 84 includes account file 86, which represents the electronic file for a given customer. Account file 86 includes account information 90, which is the typical account data that is used to identify a given customer of a credit card service, including the name of the customer, a customer unique account number, a billing address, and credit information, such as any applicable credit limits. During the life span of the account, account information 90 may be periodically updated and changed as the customer changes addresses, or credit limits are altered, and so on. Also shown in FIG. 4, account file 86 includes a transaction sequence number, abbreviated "TSN 92", which, as discussed below, will change over time. Account file 86 further contains an algorithm, which is abbreviated "ALG−96", which does not change over time. In the preferred embodiment, ALG−96 will be the reverse encryption, or de-encryption, algorithm described in the Data Encryption Standard, discussed above.

It should be noted at this point, the use of the "+" and "−" suffixes in connection with "ALG" is intended to indicate that the algorithms in memory device 34 and memory device 84 are complementary in the sense that, whereas ALG+50 performs an encryption function, ALG−96 performs a de-encryption function. More particularly, in card 20 processor 30 uses ALG+50 together with TSN 52, stored in memory device 34, to produce verification number 44. When computer 80 receives account number 24 and verification number 44, in the manner detailed below, processor 82 retrieves ALG−96 from memory device 84 and processes the received verification number 44 together with ALG−96 to produce a computed, transaction sequence number, which will eventually be compared with TSN 92, stored in memory device 84.

FIG. 4 further shows processor 82 including comparator 100, which is the portion of processor 82 which compares data. After the computed transaction sequence number is produced by processor 82 using verification number 44, comparator 100 compares that computed number with TSN 92 stored in memory device 84. If the computed, transaction sequence number "corresponds" with TSN 92, as the term "correspondence (corresponds)" is hereinbelow defined, computer 80 will verify and approve the transaction, otherwise it will not.

Assuming that computer 80 does verify the transaction, processor 82 then increments TSN 92, and stores the incremented transaction sequence number back in memory device 84, as TSN 92.

Also shown on FIG. 4 is operator 102, who could be the card holder; however, in practical use applications it may also be another person, such as a clerk who is processing a retail transaction for the card holder. In accordance with this description, operator 102 is a person who enters certain account information, including verification number 44, into station 104. As shown on FIG. 4, station 104 is linked to computer 80 by means of transmission link 106, which is typically a telephone network.

In one application of the embodiment of the invention, operator 102 could be the card holder placing a long distance call, and station 104 is a public telephone. In yet another application, operator 102 could be a store clerk verifying a credit card transaction, and station 104 is the computer keypad or keyboard, or telephone linking the clerk to computer 80.

In order to explain the process by which card 20 and computer 80 are used together to improve the security of credit card transactions, reference will be made to the flow diagrams provided on FIGS. 5 and 6, as well as to an example developed in conjunction with FIG. 6 to illustrate certain principles about the operation of the embodiment of the invention.

Figure 5:
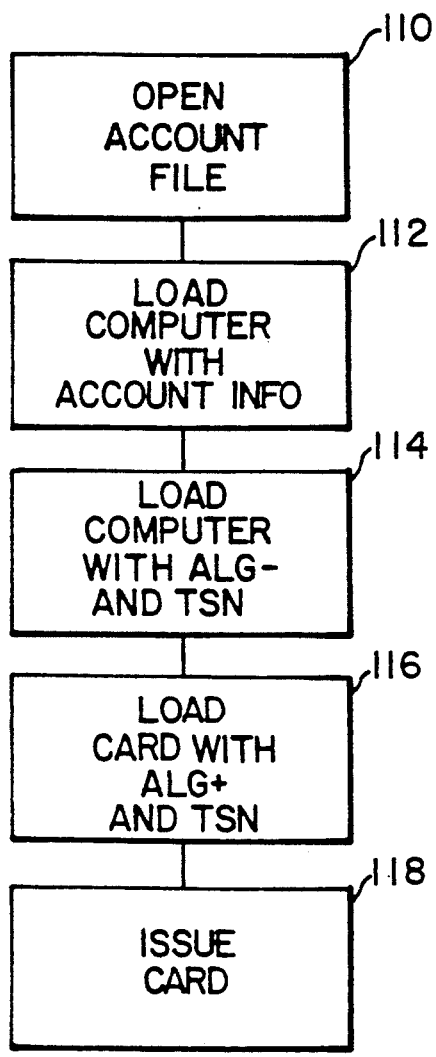
FIG. 5 is a flow diagram showing the process by which a card holder's account is established.

As shown in FIG. 5, the flow diagram commences with the creation of the card holder's account by opening an account file 86 in computer 80 (Step 110, FIG. 5). This is accomplished in a manner similar to the creation of an account with a traditional credit card. More particularly, the entity issuing the credit card will set up account file 86 so that memory device 84 is loaded with the relevant account information 90, which includes the name of the given customer, an account number, a billing address, and probably credit limits (Step 112, FIG. 5).

In this particular embodiment, computer 80 is designed to access the accounts of the various customers of the card issuer by reference to the account number. The account number is the same as the number that is printed on the issued credit card, such as account number 24 shown on FIG. 1. In addition to loading account file 86 with account information 90, when the account is established, account file 86 is also loaded with a particular transaction sequence number, such as TSN 92, and a particular de-encryption algorithm, such as ALG−96, both shown in FIG. 4 (Step 114, FIG. 5).

In addition, the process of establishing a customer account further involves loading memory device 34 of card 20 with a transaction sequence number, such as TSN 52, and an encryption algorithm, such as ALG+50 (Step 116, FIG. 5). At the point the account is established and information is loaded in memory devices 34 and 84, TSN 52 and TSN 92 can be virtually any number, subject to the limitations discussed below.

In choosing the initial values for TSN 52 and TSN 92, it is necessary to anticipate that computer 80 will indirectly test the correspondence between these two numbers, and that correspondence is used as the basis for determining whether a given credit transaction is authorized by computer 80. In this detailed description, the term indirectly testing the "correspondence" means that computer 80 will compute a transaction sequence number, which is based on TSN 52, and then compare that computed transaction sequence number with TSN 92. In one implementation "correspondence" may exist only when the computed transaction sequence number is identical to TSN 92, while in other implementations "correspondence" may exist when the computed transaction sequence number falls within a certain predetermined margin.

For example, in one embodiment of the invention, the relationship between TSN 52 and TSN 92 may require those two numbers to be identical in order for computer 80 to verify the transaction. In other words, computer 80 will only verify a transaction if the computed transaction sequence number is identical to TSN 92. To the extent that the computed transaction sequence number is based on TSN 52, in such an implementation, it would be necessary to insure that upon loading of TSN 52 in card 20 and TSN 92 in computer 80 they are equal. Such a close correspondence will create a very high degree of security for credit transactions; however, it may be more practical to implement a correspondence relationship that includes a margin of error for reasons discussed below.

In another implementation of the invention, a margin of error is implemented in the correspondence relationship. In such an implementation, the correspondence may be somewhat looser, given that computer 80 will verify a credit transaction in which the computed transaction sequence number falls within a given numerical margin of TSN 92. For example, computer 80 may allow a margin of error equal to 5, which means that if the computed transaction sequence number falls within 5 of TSN 92, then the two numbers "correspond", and computer 80 will verify the transaction. Anything outside that margin results in a rejection.

In yet another embodiment, there may be a double margin of error (or a single margin divided into a first and second portion) which is used to determine correspondence. In this implementation, computer 80 will automatically authorize any transaction in which the computed transaction sequence number falls within a given margin, such as 5 in the example above, of TSN 92. In addition, a second margin is implemented such that if the computed transaction sequence number falls within a second margin, computer 80 invokes a separate authorization sequence which may involve human intervention before the transaction is allowed.

For example, computer 80 may have a first margin equal to 5, such that any computed transaction sequence number that is within 5 of TSN 92 results in an automatic authorization. Computer 80 further implements a second margin which establishes that if the computed transaction sequence number falls between a margin ranging between 6-10 away from TSN 92, for example, then computer 80 will signal an agent of the card issuer. The issuers agent then communicates with the party who is attempting to make the transaction, possibly by telephone or computer, to see whether the party can furnish correct information in response to questions asked by the agent. The solicitation of this additional information is to try to determine whether the person attempting the transaction is probably the legitimate card holder.

For example, the issuers agent may ask the party questions relating to the card holder's account—such as street address, birth date, mother's maiden name, and the like. Such information is usually only known by the legitimate card owner, so that correct answers greatly increase the probability that the legitimate card owner is the party attempting the transaction.

The implementation of the margin system in determining correspondence has practical advantages given that there are a number of reasons that TSN 52 and TSN 92 may fall out of synchronization, or identity, even if they were identical when the card was originally issued. For example, it is possible that the card holder may inadvertently push switch 26, shown in FIG. 2A, which, in one embodiment, causes card 20 to process verification number 44 and increment TSN 52, as described above. Given that, in this example, the incrementation is not part of a deliberate credit transaction, TSN 92 will not be incremented, resulting in a loss of synchronization between TSN 52 and TSN 92.

Alternatively, the card holder may intentionally process a verification number 44 in order to undertake a credit transaction; however, due to the unavailability of computer 80, or temporarily incapacitated telephone lines, the transaction may not be processed to completion. Thus, in such cases, TSN 52 would have been incremented, even though TSN 92 was never incremented, resulting in the two numbers falling out of synchronization. Thus, a correspondence test which is based on the margin system better accommodates practical applications of card 20.

Additional features could be added to a system which implements the margins approach. For example, although it is possible for TSN 52 to be incremented without the incrementation of TSN 92, the reverse is not likely, namely TSN 92 is not likely to be incremented without TS 52 being incremented. This is because TSN 92 only gets incremented after computer 80 verifies a transaction, which only occurs after card 20 has produced a verification number 44, which automatically causes TSN 52 to be incremented. Therefore, in order to enhance the security of a system which involves margins, computer 80 can implement a "positive margin", meaning that the margin is only applicable in the positive direction. In other words, computer 80 will verify a transaction only if the computed transaction sequence number falls within the range between TSN 92 and some number greater than TSN 92, such as TSN 92 +5 where the exemplary margin is equal to 5. Thus, computed transaction sequence numbers less than TSN 92 would not result an authorization by computer 80, even if they were within five of TSN 92.

Computer 80 may also update TSN 92, whenever it finds a lack of identity between the computed transaction sequence number and TSN 92, but the computed transaction sequence number nonetheless falls within the established margins. In other words, after computer 80 determines that the computed transaction sequence number is not equal to TSN 92, but it does fall within allowable margins, computer 80 could change TSN 92 so that it is reset to the value of the computed transaction sequence number. To the extent that the computed transaction sequence number reflects the value of TSN 52, this updating approach will restore the synchronization between TSN 52 and TSN 92. Likewise the updating of TSN 92 could be done if the system were based on the double margin implementation, which involves the intervention of the issuer's agent, as discussed above.

In the preferred embodiment, computer 80 tests the correspondence of TSN 52 and TSN 92 based on a positive margin. Additionally, the margins can obviously be changed on the basis of particular implementations. The actual margin information can be loaded into a given customer account file along with the other customer account information discussed in connection with steps 112 and 114, above.

Additionally, one other factor that may influence the selection of the initial TSN 52 and TSN 92 is that the numbers cannot be so large that its binary representation exceeds the memory capacity of the memory devices. Not only should it not exceed the limits when it is first loaded, but it must be planned that it will not exceed the memory capacity as the transaction sequence number is incremented over time. Practically speaking, this is only a concern with respect to memory device 34 of card 20, given that memory device 84 is, in this context, virtually limitless.

Still referring to the flow diagram of FIG. 5, after card 20 and computer 80 are loaded with their respective algorithms and transaction sequence numbers and account information, card 20 is issued to the authorized account owner for use (Step 118, FIG. 5).

In order to demonstrate the method by which card 20 works together with computer 80 to create a secure transaction, an example will be developed using simplified numbers which demonstrate the principle by which the embodiment operates. This example is discussed in conjunction with the flow diagram of FIG. 6.

This example is based upon a telephone credit card issued to a legitimate card owner, and the card owner's account includes the particular data shown in Table B. In addition, in the particular example developed, when card 20 and computer 80 increment their respective transaction sequence numbers, they will each increment by 5, instead of 1. Incrementation by differing numbers for the cards issued by a particular issuer adds yet another layer of security to the implementation of the security system. Thus, Table B includes an incrementation factor, which is stored in the respective memory devices 34, 84. Also, the incrementation factors shown in Table B is the same for card 20 and computer 80.

TABLE B

| Card 20: | initially loaded TSN 52 = 1;<br>ALG+ 50 : add 10 to TSN 52 to produce verification number 44; and<br>incrementation factor = 5. |
|---|---|
| Computer 80: | initially loaded TSN 92 = 1;<br>ALG− : subtract 10 from verification number 44 to produce TSN 92;<br>incrementation factor = 5; and<br>positive margin = 10. |

Although a preferred algorithm has been identified above, for the purpose of illustrating the principles underlying the embodiment of the present invention, a greatly simplified algorithm is presented in this particular example. Such a simplified algorithm is intended to serve as an example of how card 20 and computer 80 together improve the security of a credit card transaction. The principles underlying the process embodiment of the invention would be the same as this simplified example, if the algorithm of the Data Encryption Standard discussed above was used.

As shown in Table B, the loaded transaction sequence numbers, TSN 52 and TSN 92 are identical upon loading. Comparing the two algorithms shown in Table B reveals that ALG+50 creates an encrypted verification number 44 by adding 10 to TSN 52, and that verification number 44 is de-encrypted by using ALG−96, which subtracts 10 from verification number 44. Also, computer 80 includes a positive margin equal to 10.

Figure 6:
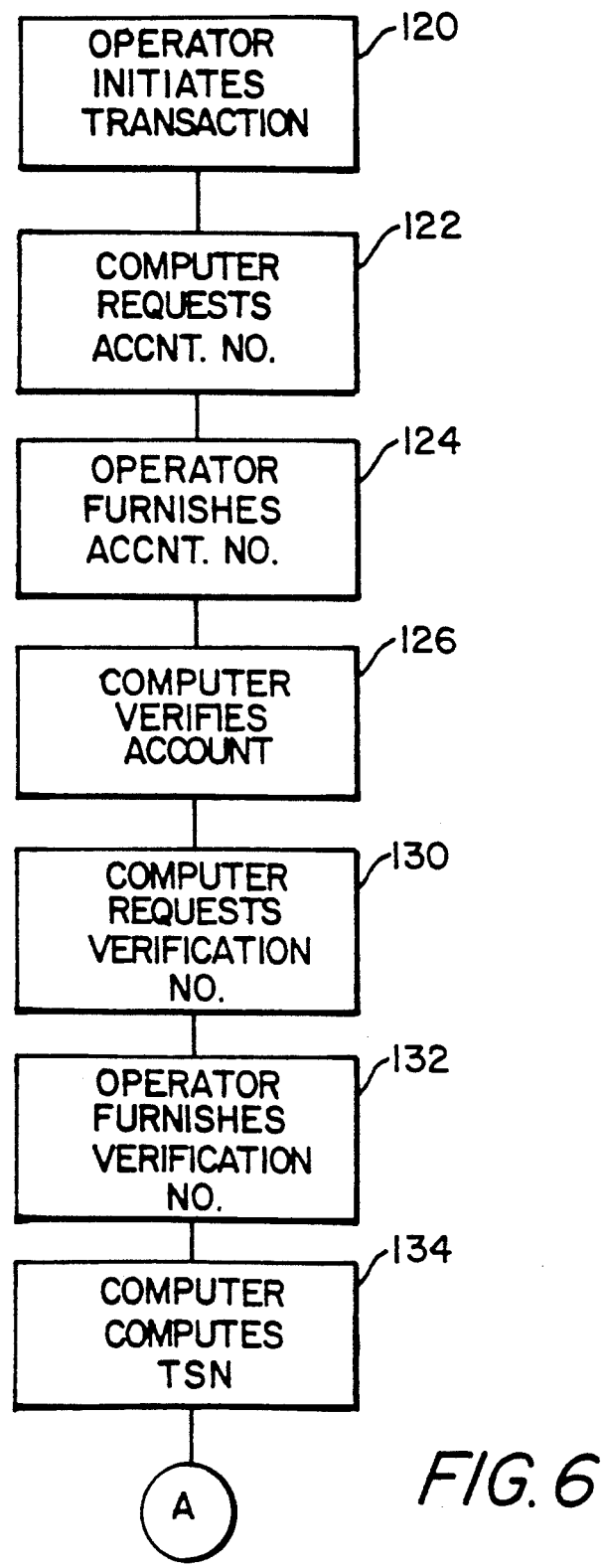
FIG. 6 is a flow diagram showing the process by which the card and computer of FIG. 4 are used to enhance the security of a credit card transaction.

Referring to the flow diagram of FIG. 6, assume a legitimate card holder wishes to make a long distance telephone call using a telephone credit card, which is card 20 in accordance with an embodiment of the present invention. In this exemplary transaction, the card owner is using card 20 for the first time after issuance such that the data of Table B has been loaded in card 20 and computer 80, and has not been changed at the time the card holder initiates this first transaction.

Referring back to FIG. 4, the card holder, or operator 102, will initiate the transaction by calling a generally accessible number of the long distance carrier over a telephone, or station 104 (Step 120, FIG. 6). The number of the carrier can be an 800 number, for example, and is generally accessible because it is distributed on a non-confidential basis to all customers of the long distance service. By dialing the access number to the long distance carrier, operator 102 is connected with the long distance carrier's computer switching network, or computer 80, which has as part of its function connecting the call for the customer. Prior to making that connection, however, computer 80 will invoke an access sequence to make sure that operator 102 is authorized to use the network, and to make sure that the service is billed to the appropriate account, in this instance the account of the card holder.

In response to the service request initiated by operator 102 and as part of the access sequence, operator 102 is requested by computer 80 to furnish an account number, such as account number 24 of card 20 shown on FIG. 1 (Step 122, FIG. 6). At this point operator 102 may well look at card 20 in order to read account number 24 from card 20, as it is unlikely that card holders of credit cards, especially those who own many credit cards, would commit their card account numbers to memory. Operator 102 next enters account number 24 through station 104, by using the key pad of the telephone, for example (Step 124, FIG. 6).

Computer 80 then calls up account file 86 in response to the provision of account number 24, and will thereby have access to all of the data in account 86. Computer 80 will check to determine if account number 24 corresponds with a valid account, and, in some instances, to determine if the request exceeds any applicable credit limits. As discussed above, memory device 84 includes account information 90 which enables computer 80 to verify the existence of the account and whether account number 24 makes the caller eligible to proceed with the request. Assuming everything relating to the account is acceptable, computer 80 verifies the account (Step 126, FIG. 6). In accordance with the embodiment of the invention, account verification by computer 80 does not necessarily mean that the requested transaction is authorized, but simply that operator 102 may proceed in the manner to be discussed below.

Thus far, the exemplary transaction is quite typical of the authorization sequence currently used by many telephone service providers. And, on a general level, the sequence is typical of the authorization of many credit card transactions. Furthermore, for many traditional credit card services, after the account number and credit limits, if any, are verified by the computer, the transaction is approved without any further verification.

This portion of the exemplary transaction, however, reveals the vulnerability of a traditional credit card systems to theft. If, while the card owner reads an account number from the traditional card, a second party were to see and retain the account number from either looking at the card or the dialing sequence on the telephone, that second party could then place unauthorized calls. As described, in order to place calls the second party needs only the access number of the carrier, which is generally available, and the account number. In the example, both of these numbers are made accessible through the transaction, or, in the case of the access number, it is likely to be accessible generally. Thus, if the second party retained both numbers, they could be used to place unauthorized calls, at least until the unauthorized calling was detected and stopped. This, however, could take enough time so that significant charges could be amassed against the account. Such fraudulent practices could be costly to the account owner, the carrier, or both.

Accordingly, an embodiment of the present invention enhances the security of a credit card transaction, by requiring the service requester to enter a verification number in addition to the other information required during the access sequence. More particularly, as shown in FIG. 2A, after operator 102 is required to provide account number 24, operator 102 is then required to provide verification number 44, in order to have the transaction authorized by computer 80.

Given that operator 102 will have to furnish verification number 44 during the access sequence, at any time prior to or during the initiation of the transaction, probably at the time operator 102 takes out card 20 to read account number 24, operator activates switch 26, shown on FIGS. 1 and 2. The precise timing of when verification number 44 is computed, relative to the other steps of the access sequence, is not critical, provided it is accessible for entry during the time computer 80 makes available for the entry of that data.

As described above, switch 26 or pad 27 will activate processor 30 to access memory device 34 and compute verification number 44 using ALG+50 and TSN 52. Using the data provided in Table B, in accordance with this particular example, processor 30 will compute a verification number 44 equal to 11, given that from Table B ALG+50 requires the addition of 10 to TSN 52 to produce verification number 44, or 10+1=11.

Given that operator 102 has already entered account number 24, and assuming that computer 80 retrieves the account file 86 and determines that the account is valid for the request, computer 80 next requests operator 102 to enter verification number 44 produced by card 20 (Step 130, FIG. 6). Verification number 44 is provided through station 104, which in the example is a telephone key pad. Thus, in response to the request by computer 80, operator 102 transmits the number 11 through station 104 (Step 132, FIG. 6).

Continuing with the authorization sequence of the preferred embodiment, computer 80 will receive verification number 44 from station 104. As detailed above, processor 82 of computer 80 then retrieves ALG−96 and the applicable positive margin from the account file 86. As discussed above, processor 82 will process verification number 44 together with ALG−96 and compute a transaction sequence number (Step 134, FIG. 6). In this example, which is based on the data in Table B, ALG−96 subtracts 10 from verification number 44 to produce a computed transaction sequence number equal to 1, or 11−10=1.

Next, processor 82 retrieves TSN 92 from memory device 84, and tests whether the computed transaction sequence number corresponds to TSN 92 (Decision step 136, FIG. 6). In this example, correspondence is based on testing whether the computed transaction sequence number falls within the range TSN 92 through TSN 92+10. If so, then computer 80 will authorize the transaction (Step 140, FIG. 6); if not, computer 80 rejects the transaction, or, in this particular example, would not let operator 102 place the call (Step 142, FIG. 6). As discussed above, in other implementations computer 80 could include a double margin, which involves a second test to determine if the computed transaction sequence number falls within a second margin, in which case the issuer's agent queries the party attempting the transaction in the manner described above.

In accordance with the example, the computed transaction sequence number is the same as TSN 92, or 1=1, so computer 80 will authorize the transaction, and operator 102 will be permitted to make the telephone call.

Next, both card 20 and computer 80 update their respective transaction sequence numbers 52, 92, so that a new transaction sequence number is stored in their respective memory devices 34, 84. As shown on Table B, processor 30 increments TSN 52 by 5 (Step 144, FIG. 6), and processor 82 likewise increments TSN 92 by 5 (Step 146, FIG. 6). Thus, after incrementation, TSN 52 and TSN 92 are both equal to 6, and are both stored in their respective memory devices 34, 84.

Additionally, if computer 80 implements a margin system, and during any given transaction approval process computer 80 detected a lack of identity between the computed transaction sequence number and TSN 92, at Step 146 computer 80 could correct TSN 92 so that it is once again synchronized with TSN 52. This, of course, is based on the assumption that the computed transaction sequence number fell within the applicable margins, and computer 80 determined that transaction should be authorized.

In order to further show how the embodiment of the invention increases transaction security, it will be assumed that a second party observed the entire transaction of operator 102. It will further be assumed that the second party retained the account number 24 and the verification number 44 entered by operator 102 in making the telephone call. The second party will then attempt to use those numbers to place a telephone call which is to be charged against the account number 24 of the legitimate card holder.

As indicated, the access number of the long distance carrier is assumed to be generally available. Thus, the second party makes contact with computer 80 through station 104, and computer 80 requests an account number. Account number 24 is entered and recognized by computer 80 as a valid account. Computer 80 next requests a verification number, but the only verification number the second party has is the one entered during the previous transaction. Alternatively, the second party could guess at a verification number, which is unlikely to be effective. In this example, the second party transmits the number 11, which was the previous verification number 44, to computer 80.

As discussed, computer 80 accesses ALG−96 from account file 86, which is the account identified by the specific account number 24 provided by the second party. Computer 80 will process ALG−96 with the transmitted verification number 44. Using the number 11, processor 82 will compute the transaction sequence number 1, or 11−10=1. Thus, when comparator 100 tests the correspondence between the computed transaction sequence number with TSN 92, then stored in memory device 84, the two numbers will not correspond because the value 6 was stored in memory device 84 after the last transaction. It will be recalled that the margin implemented in this example is "positive" 10.

Thus, even though the computed transaction sequence number is within 10 units of TSN 92, (i.e. 1 is within 10 units of 6), computer applies the margin only in the positive direction. Given that the computed transaction sequence number is less than TSN 92, computer 80 concludes that an invalid verification number 44 has been presented, and refuses to authorize the transaction. Accordingly, computer 80 would not allow the second party to charge the call to the given account number 24.

To complete this example, it will be assumed that after the first transaction, the legitimate card owner wishes to conduct a second transaction, namely place a second call. In preparing to do so, the card owner will be assumed to have had card 20 produce a verification number 44, which automatically results in the incrementation of TSN 52. Due to some problem with the telephone network, however, it will be further assumed that when the card holder attempted to place the second call, the network was blocked such that the card owner never even had a chance to attempt authorization. Nonetheless, as a result of the incrementation in card 20, TSN 52 is now equal to 11, or 6+5=11.

Shortly thereafter, the card holder attempts the call again, and this time the telephone network is operating. As shown on FIG. 4, operator 102 furnishes account number 24 through station 104. After account confirmation, as described above, computer 80 will again request verification number 44. In this instance, TSN 52, which is stored in memory device 84 is 11. As the number 11 is processed by processor 30 using ALG+50, verification number 44 is made equal to 21, or 11+10=21. Operator 102 reads verification number 44, in window 32 of card 20, and then transmits it to computer 80 through station 104.

As in the previous exemplary operations, processor 82 of computer 80 processes verification number 44 with ALG−96 to generate a computed transaction sequence number equal to 11, or 21−10=11. Then, using the established positive margin for this account, comparator 100 will test the correspondence between the computed transaction sequence number and the stored TSN 92. Note that the two numbers are not equal due to the fact that the synchronization between the TSN 52 and TSN 92 was lost when the card owner attempted the transaction that never went through.

On the other hand, computer 80 implements a margin system such that comparator 100 tests correspondence on the basis of whether the computed transaction sequence number falls within TSN 92 through TSN 92+10. In this instance that range is actually 6 through 16. Given that 11, the computed transaction sequence number, falls within this range, computer 80 will verify the transaction. Additionally, computer 80 will note that TSN 92 is out of synchronization the computed transaction sequence number, and therefore TSN 52, and computer 80 will "correct", or synchronize, TSN 92 with TSN 52 by changing TSN 92 to 11, before the automatic incrementation by 5.

Thus, not only will the transaction be approved, but also when TSN 52 is next incremented by 5, so that 16 is stored in memory 34, the corrected TSN 92 will likewise be incremented by 5, so that 16 is stored in memory 84.

By creating a transaction unique, verification number 44 which is required as part of the sequence by which credit card transactions are verified, the embodiment enhances the security of the credit card transaction. By requiring the unique verification number 44, the process effectively renders useless the verification number generated in one transaction for use during a subsequent transaction. Thus, even if an unscrupulous party were to observe and retain the numbers used to authorize one transaction, they would be useless for subsequent transactions.

As indicated above, the example provided used highly simplified numbers for the purpose of illustrating the principles of the process and how card 20 and computer 80 work to secure the transaction. Thus, the numbers produced may seem simple; however, with card 20 implementing a more sophisticated algorithm, such as the one referred to above, it would be statistically impossible for a would-be thief to guess the correct verification number 44 for a future transaction, from the verification number 44 of a past transaction. As shown in the exemplary numbers of Table A, the verification numbers 44 bore no apparent relationship to one another, even though they were produced by simple numbers which were incremented by 1. Additionally, because of the incrementation of TSN 52 after each transaction, it is not possible for the same transaction sequence number to be produced by a given card 20, and correspondingly it is not possible for the same verification number 44 to be produced twice by the given card 20.

Several additional points should be noted with respect to the embodiment of the invention. Firstly, the example provided an application of the embodiment of the invention to telephone credit cards. Card 20 can also be used in connection with a typical credit card transaction, and provide the enhanced transaction security.

For example, if the legitimate owner of card 20 were to purchase an item in a store, the clerk, or operator 102 in FIG. 4, could enter the account number 24 into station 104. In this example, station 104 could be a card reader for reading account number 24 from a magnetic strip on card 20. Alternatively, station 104 could be a telephone or computer key pad, in which case operator 102 could enter account number 24 by means of either of these.

As in the previous example, after account verification, computer 80 requests verification number 44, which is produced by card 20 in the manner discussed above. Assuming a correspondence between the stored TSN 92 and the computed transaction sequence number produced by processor 82, computer 80 authorizes the transaction.

Once again, if the store clerk or another party were to attempt to use the numbers from the previous transaction, due to the incrementing of transaction sequence numbers 52, 92, in memory devices 34, 84, the verification number 44 from the earlier legitimate purchase would not work for the same reasons provided in connection with the second party who attempted the illicit telephone call. Accordingly, the embodiments of the present invention can be applied to credit card transactions generally, not simply telephone credit cards.

Additionally, it should be noted that the embodiments of the invention are suitable for mass production and implementation. As discussed in one embodiment, when the account of the card holder is established, there will be a coordination between the data in memory device 34 of card 20 and memory device 84 of computer 80. In particular, the two will have corresponding transaction sequence numbers and incrementation factors, if any, and complimentary algorithms. Given that the installation of this data is relatively straightforward it is feasible to implement on a wide scale.

Yet another reason the embodiments of the present invention are suitable for mass production, while still preserving security, is that the issuer of the cards can initially load different algorithms, transaction sequence numbers, and incrementation factors in some or all of the cards of their different customers. Loading different numbers insures that the verification number produced by one card is useless in determining the verification number which will be produced by another card, even though the cards are issued by the same entity. Changing the initially loaded algorithms, transaction sequence numbers, and incrementation factors for the cards produced by the issuer is also accomplished in a straightforward manner when the accounts are established and the cards are produced.

In yet another embodiment of the invention, it is even possible to eliminate the need for establishing the initial correspondence between TSN 52 and TSN 92. Instead, in this alternate embodiment, a batch of cards 20 could be manufactured in which TSN 52 is not set to any particular number, for example memory 34 could be completely blank. In other words, TSN 52 for all of cards 20 could be 0. Additionally, TSN 92 would likewise be blank, or 0. This, of course, has significant advantages with respect to the mass production of cards 20, insofar as it does not require the recordation and coordination of the TSN 52 and TSN 92 at the time cards 20 are made and issued.

In this implementation, processor 30 of card 20, shown on FIGS. 2A and 2B, includes a random number generator 102, which is capable of generating a random number that would be suitable as the first TSN 52, in accordance with the parameters discussed above.

Then, after card 20 is issued and the card holder attempts the first transaction and signals card 20 to produce a verification number 44, processor 30 will first generate the random number using random number generator 102. This will be stored in memory 34, and will then be accessed by processor 30 along with ALG+50 for the purpose of producing the first verification number 44. Verification number 44 will then be furnished to computer 80 in the same manner detailed above.

When computer 80 receives the verification number 44 it will, as discussed, use ALG−96 to compute a transaction sequence number. Unlike the forgoing examples, however, computer 80 does not have a specific value for TSN 92 that it can test for correspondence with the computed transaction sequence number. In this particular implementation, however, computer 80 will use the computed transaction sequence number as TSN 92, which effectively assures authorization of the first transaction relating to card 20.

Thereafter, however, card 20 and computer 80 will at that point have synchronized numbers, and the system can work in the same manner as detailed above.

In yet another embodiment, the same approach can be implemented, however, the system can be based on the understanding that the very first use of the card is solely for the establishment of TSN 52 and TSN 92. Thus, in order to increase the security of the system, such an approach can prohibit the charging of any services or goods against the card until the second time it is used.

The invention in its broader aspects is not limited to the specific details, representative apparatus, and illustrative examples shown and described herein. Thus, departures may be made from such details without departing from the spirit or scope of the invention.

What is claimed is:

1. A credit card apparatus comprising:
   a memory means for storing data;
   an encryption algorithm stored in said credit card for encrypting data, said algorithm being complementary to a de-encryption algorithm stored in an authorization computer;
   a first transaction sequence number stored in said memory means, said transaction sequence number corresponding to a second transaction sequence number stored in the computer;
   a display means;
   a processing means for processing said encryption algorithm and said first transaction sequence number to produce a verification number, which is visually displayed in said display means, for conveyance to the computer which computes a transaction sequence number using the de-encryption algorithm and which tests the correspondence of the computed transaction sequence number with the second transaction sequence number for determining whether a given credit card transaction is to be authorized; and
   said processing means changes said first transaction sequence number, and stores the changed first transaction sequence number in said memory means.

2. The apparatus as in claim 1, further comprising an activation means for activating said processing means to produce a verification number.

3. The apparatus as in claim 2, wherein said activation means includes an activation pad which requires the entry of an identification code in order to activate said processing means to produce the verification number.

4. The apparatus as in claim 1, wherein said encryption algorithm
   changes said first transaction sequence number, provided the given credit card transaction is authorized, and stores the changed first transaction sequence number in said memory means.

5. A computer for authorizing a credit card transaction comprising:
   a memory means for storing data;
   a de-encryption algorithm stored in said computer for de-encrypting a verification number produced by a credit card using an encryption algorithm;
   a first transaction sequence number stored in said memory means, said first transaction sequence number corresponding to a second transaction sequence number stored in a credit card;
   a processing means for processing said de-encryption algorithm and the verification number to produce a computed transaction sequence number, said processing means also being for testing the correspondence of the computed transaction sequence described in the publication "Federal Information Processing Standards Publication" (FIBS PUB 46 of Jan. 15, 1977, of the National Bureau of Standards of the U.S. Department of Commerce and reaffirmed Jan. 22, 1988 as FIBS PUB 46-1) encodes said first transaction sequence number when processed by said processing means.

6. The computer as in claim 5, wherein said computer authorizes a given credit card transaction on the basis of whether the computed transaction sequence number corresponds to said first transaction sequence number.

7. The computer as in claim 6, wherein said computer determines correspondence on the basis of the computed transaction sequence number falling within a predetermined range of said first transaction sequence number.

8. The computer as in claim 7, wherein said computer resets said first transaction sequence number to be equal to the computed transaction sequence number if, with said computer determining whether a given credit card transaction is to be authorized, the computed transaction sequence number is not equal to said first transaction sequence number, and the computed transaction sequence number falls within said predetermined range.

9. The computer as in claim 6, wherein said computer determines correspondence on the basis of the computed transaction sequence number falling within a predetermined range of said first transaction sequence number, said predetermined range being divided into a first and second portion.

10. The computer as in claim 9, wherein said computer automatically authorizes a transaction if the computed transaction sequence number falls within said first portion of said predetermined range.

11. The computer as in claim 10, wherein said computer invokes an additional authorization sequence if the computed transaction sequence number falls within said second portion of said predetermined range.

12. The computer as in claim 5, wherein said de-encryption algorithm encodes said first transaction sequence number when processed by said processing means.

13. A system for verifying a credit card transaction comprising:
   a credit card including:
      a first memory means for storing data;
      an encryption algorithm stored in said credit card for encrypting data;
      a first transaction sequence number stored in said memory means;
      a display means;
      a first processing means for processing said encryption algorithm and said first transaction sequence number to produce a verification number for visual display in said display means, said first processing means changes said first transaction sequence number, and stores the changed first transaction sequence number in said first memory means; and
   a computer means including:
      a second memory means for storing data;
      a de-encryption algorithm stored in said computer, said de-encryption algorithm being the complement of said encryption algorithm;
      a second transaction sequence number stored in said second memory means; and
      a second processing means for processing said de-encryption algorithm and said verification number to produce a computed transaction sequence number, said second processing means also being for testing the correspondence of said computed transaction sequence number with said second transaction sequence number, and said second processing means changes said second transaction sequence number, provided the given credit card transaction is authorized, and stores the changed second transaction sequence number in said second memory means.

14. The system as in claim 13, wherein said first and second transaction sequence numbers correspond to one another at the time said credit card is issued.

15. The system as in claim 14, wherein said computer authorizes credit card transactions on the basis of whether the computed transaction sequence number corresponds to said second transaction sequence number.

16. The system as in claim 15, wherein said computer determines correspondence on the basis of the computed transaction sequence number falling within a predetermined range of said second transaction sequence number.

17. The system as in claim 16, wherein said predetermined range is divided into a first and second portion, and said computer automatically authorizes a given transaction if the computed transaction sequence number falls within said first portion of said predetermined range, and invokes a separate authorization sequence if the computed transaction sequence number falls within said second portion of said predetermined range.

18. The system as in claim 17, wherein said second transaction sequence number is reset to be equal to the computed transaction sequence number if, with said computer determining whether a given credit card transaction is to be authorized, the computed transaction sequence number is not equal to said second transaction sequence number, and the transaction is authorized.

19. The system as in claim 13, wherein said encryption and de-encryption algorithms encode and decode said first and second transaction sequence numbers when processed by said first and second processing means, respectively.

20. The system as in claim 13, further comprising an activation means for activating said first processing means to produce a verification number.

21. The system as in claim 20, wherein said activation means includes an activation pad on said credit card for the entry of an identification code in order to activate said processing means to produce a verification number.

22. The system as in claim 13, wherein said first processing means further includes a random number generator for producing said first transaction sequence number.

23. The system as in claim 22, wherein said random number generator generates a random number which is stored in said first memory means as the initial said first transaction sequence number, and wherein with said computer determining the authorization of a first transaction relating to said card after said card was issued, said computer automatically resets said second transaction sequence number to be equal to the computed transaction sequence number.

24. The system as in claim 13, wherein said first and second processing means change their respective first and second transaction sequence numbers by incrementation.

25. The system as in claim 24, wherein said first and second transaction sequence numbers are incremented by the same number.

26. A method of authorizing a credit card transaction comprising the steps of:
- requiring the provision of identification information to an authorization computer;
- using the identification information to access a file in the computer containing a de-encryption algorithm and a first transaction sequence number, the de-encryption algorithm being complementary to an encryption algorithm stored in a credit card, and the first transaction sequence number corresponding to a second transaction sequence number stored in the credit card;
- requiring the provision of a verification number, produced by the credit card using the second transaction sequence number and the encryption algorithm;
- processing the verification number with a processing means in the computer to produce a computed transaction sequence number;
- testing the correspondence of the computed transaction sequence number to the first transaction sequence number to determine whether a given credit card transaction is authorized; and
- changing the first transaction sequence number if the given credit card transaction is authorized.

27. The method as in claim 26, further comprising the step of:
- authorizing a given credit card transaction if the computed transaction sequence number corresponds to the first transaction sequence number.

28. The method as in claim 27, wherein during said authorizing step correspondence is determined on the basis of whether the computed transaction sequence number falls within a predetermined range of the first transaction sequence number.

29. The method as in claim 28, wherein the predetermined range is divided into a first and second portion, and the computer automatically authorizes a given credit card transaction provided the computed transaction sequence number falls within the first portion of the predetermined range.

30. The method as in claim 29, wherein the computer invokes a separate authorization sequence provided the computed transaction sequence number falls within the second portion of the predetermined range.

31. The method as in claim 27, further comprising the step of:
- resetting the first transaction sequence number to be equal to the computed transaction sequence number if, with the computer determining whether a given credit card transaction is to be authorized, the computed transaction sequence number is not equal to the first transaction sequence number, and the transaction is authorized.

32. The method as in claim 26, wherein during said changing step the first transaction sequence number is incremented by a predetermined number.

33. The method as in claim 32, wherein the predetermined number by which said first transaction sequence number is incremented is equal to a number by which the processing means in the credit card increments the second transaction sequence number after the production of the verification number.

* * * * *